July 5, 1949.　　　　W. C. VINES　　　　2,475,342
AUTOMATIC DRILLING MACHINE
Filed June 12, 1946　　　　3 Sheets—Sheet 1
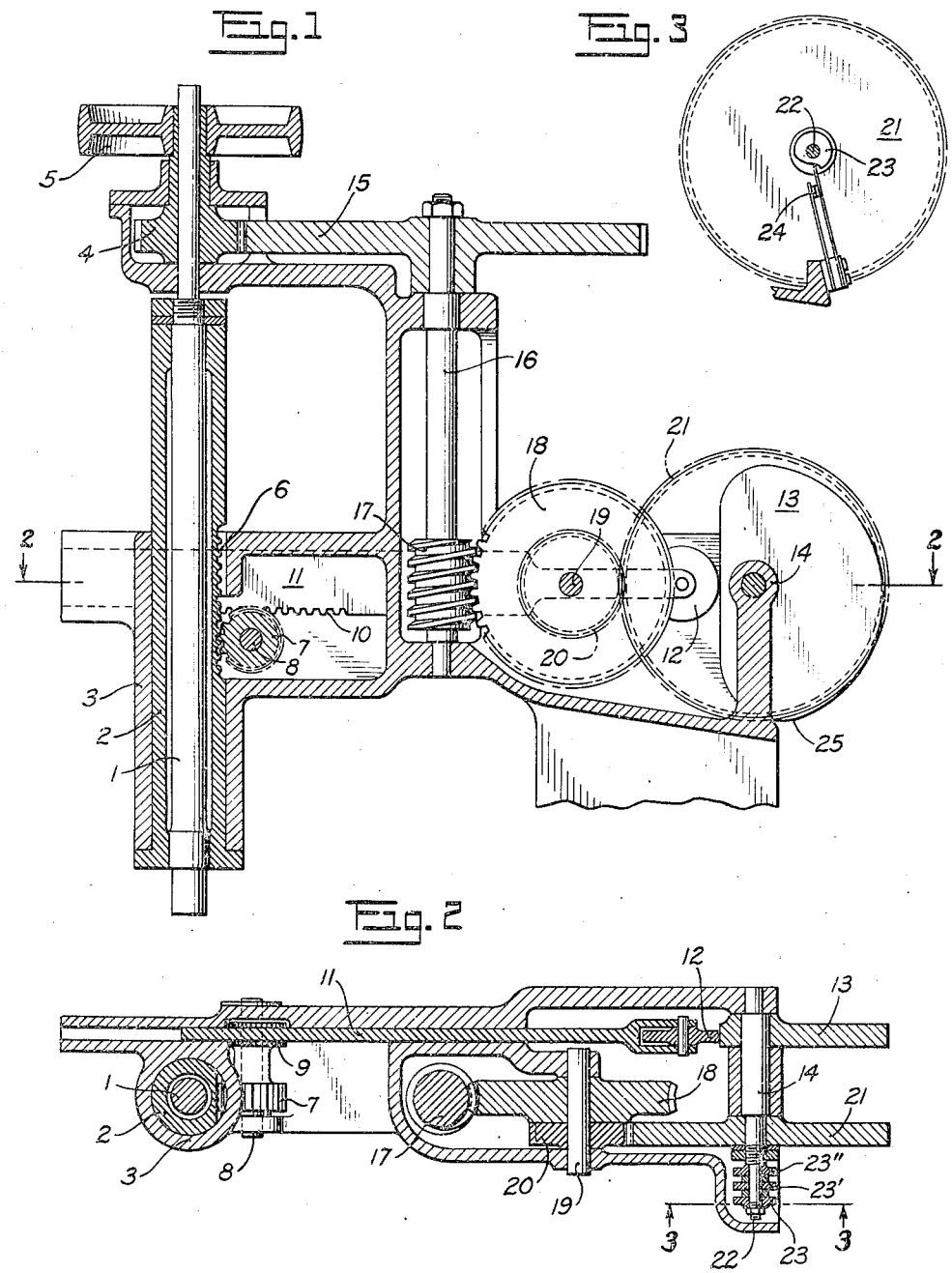

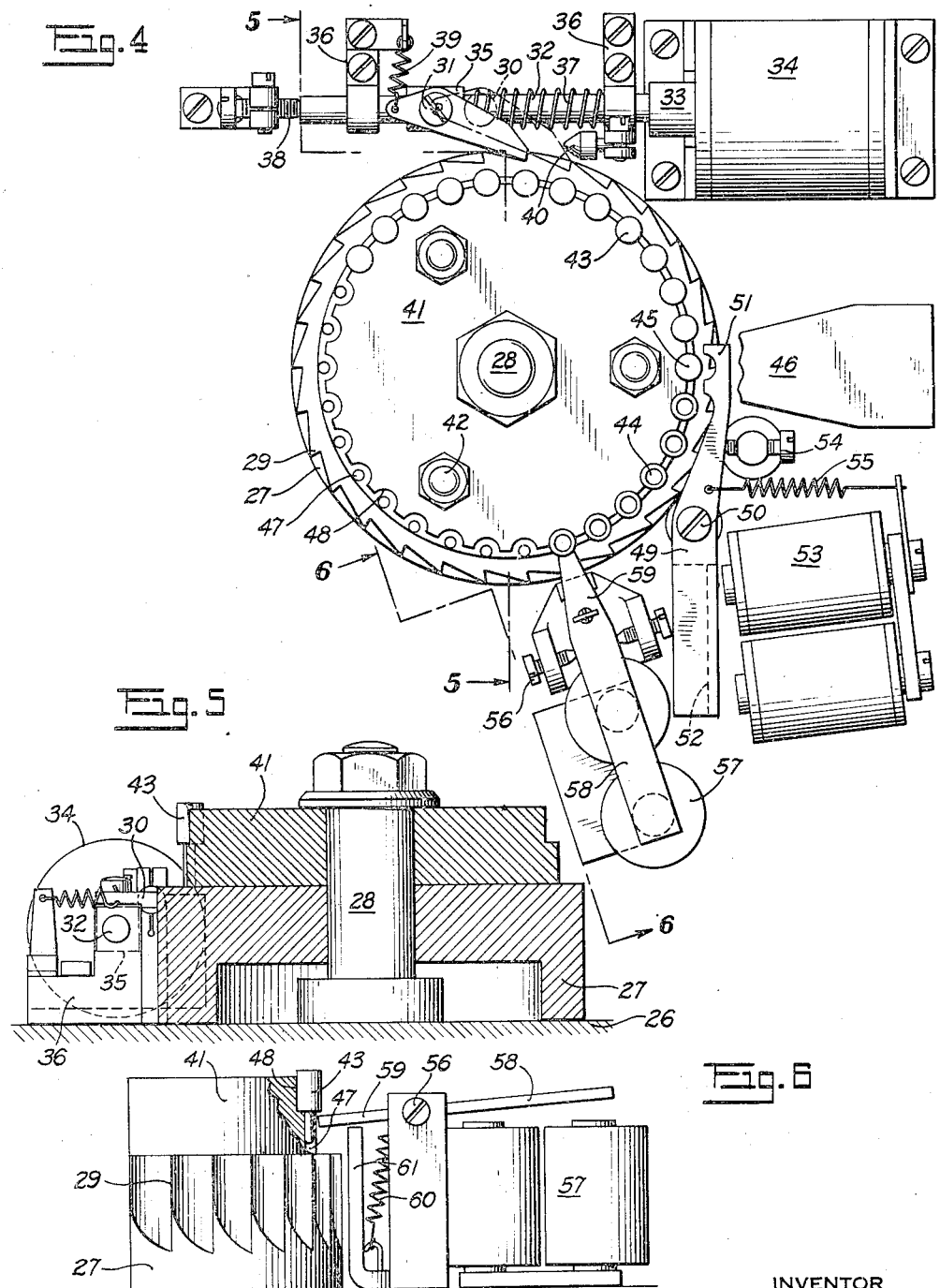

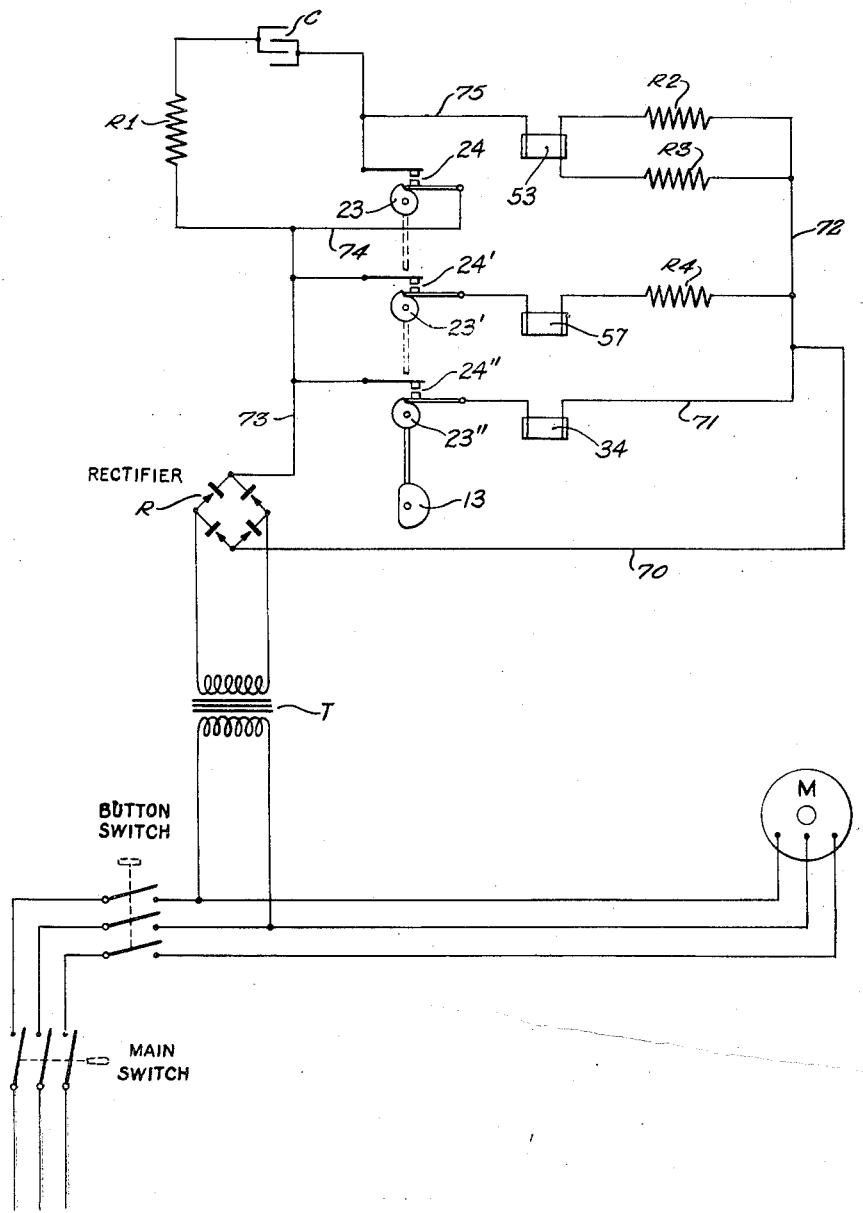

Patented July 5, 1949

2,475,342

UNITED STATES PATENT OFFICE 2,475,342

AUTOMATIC DRILLING MACHINE

William Charles Vines, Southampton Row, London, England, assignor to International Business Machines Corporation, New York, N. Y., a corporation of New York Application June 12, 1946, Serial No. 676,217
In Great Britain June 26, 1945

4 Claims. (Cl. 77—64)

This invention relates to automatic drilling machines.

The object of the invention is an automatic drilling machine in which the indexing holding and ejecting devices can be easily adapted to different work fixtures.

According to the invention, the automatic devices for bringing and registering the work pieces successively into operative position and ejecting them and, where necessary, holding them, are operated without mechanical connection with the drilling spindle or connected moving parts, by electric circuits comprising contact devices operated by cams on a slow speed shaft mechanically connected with the feeding means of the drilling spindle. The fixed table of the drilling machine may support an indexing table operated electromagnetically and adapted to support the work piece fixture and an electromagnetically operated ejecting device attached to the fixed table. An electromagnetically operated registering device may be attached to the fixed table and adapted to register the table, after indexing, into accurate position by pressure applied radially to the formed edge of the indexing table or fixture or to work pieces on the fixture. An electromagnetically operated holding device may be attached to the fixed table, adapted to hold work pieces against being rotated by the drill. The slow speed shaft of the drilling machine may carry a cam for feeding the drill spindle and the cams controlling the electric circuits.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a vertical section through the head of the drilling machine, to some extent diagrammatic.

Fig. 2 is a horizontal section through the line 2—2 of Fig. 1.

Fig. 3 is a part vertical section through the line 3—3 of Fig. 2, showing the cam contacts.

Fig. 4 is a plan view of the indexing fixture.

Fig. 5 is a view of Fig. 4 from the left with part section through the line 5—5 of Fig. 4, and omitting the ejecting devices.

Fig. 6 is a half side elevation at right angles to the line 6—6 of Fig. 4, showing the ejecting device, and Fig. 7 is a wiring diagram of the electrical controls.

Referring to Figs. 1, 2, and 3, the spindle 1 of the drilling machine is journalled in a sleeve 2, which is adapted to slide downwards from the position shown in the guide 3 of the frame. Above the sleeve 2, the spindle 1 passes through a gear wheel 4 with a feather key and an extension of the gear wheel carries the driving pulley 5. The sleeve 2, is moved downwards, carrying with it the spindle 1, by means of a rack 6 formed on the sleeve, which is engaged by a pinion 7 free on the stud 8. Fixed to the pinion 7 by a common sleeve is another pinion 9 which engages a rack 10 formed on the lower edge of a bar 11. The bar 11, at its right hand end carries a roller 12 which bears against a cam 13 on the shaft 14. If the bar 11 be moved to the left by the cam 13, it turns the pinions 9 and 7 and lowers the sleeve 2 and spindle 1 to feed the drill. The roller 12 is kept in contact with the cam 13 by a spring, not shown.

The gear wheel 4 engages a gear wheel 15 on a shaft 16. This shaft carries a worm 17 engaging a worm wheel 18 free to turn on the stud 19. Fixed to the worm wheel 18 is a pinion 20 which engages a gear wheel 21 on the shaft 14. An extension 22 of the shaft 14 carries three cams 23 adapted to operate electrical contacts 24 (Figs. 3 and 7).

From the above, it is seen that there is a high speed reduction from the spindle of the drilling machine to the shaft 14, and that one revolution of this shaft determines a cycle of operation of the drilling machine during which the drill is fed downwards, and then brought up again, while three electric contacts are made and broken at times determined by the cams 23. While the cam 13 turns counterclockwise from the position shown, the feed of the drill is rapid till the point marked 13 reaches the roller 12; the drill is then entering into contact with the work; from the point 13 to the point 25, the feed is slow, the drill then cutting its hole; from the point 25 to the position shown, the return of the drill is again rapid.

Figs. 4, 5, and 6 show the indexing table which is held on the fixed table 26 (Fig. 5) of the drilling machine and carries the work pieces. The base 27 of the indexing table is adapted to turn on the stud 28 fixed to the table 26 and is provided with ratchet teeth 29. The teeth 29 are engaged by a ratchet 30 pivoted at 31 to the square portion 35 of a bar 32 fixed to the plunger 33 of a solenoid 34. The bar 32 is guided in blocks 36. A spring 37 (of which only a few turns are shown) bears against the square portion 35 and normally retains the bar 32 and ratchet 30 in the position shown in which the bar abuts on a stop 38. A spring 39 keeps the ratchet against the teeth 29. When the solenoid 34 is energized, the plunger 33, with bar 32 and ratchet 30, is drawn to the right bringing the ratchet 30 into the position shown in dotted lines, where it bears against a locking stop 40, which is omitted in the view of Fig. 5. This movement turns the indexing table 27 clockwise through the space of one tooth 29.

The work holding plate 41 is fixed to the top of the indexing table 27 by studs 42 and, in the example shown, is arranged to take terminal posts of the form shown best in Fig. 6 at 43. These posts are to have a hole 44 drilled. The centre of the drill is at 45, the drill guide 46 being broken away.

The stems of the posts 43 enter holes 47 in the plate 41 and their bodies fit in scallops 48 in the upper edge of the plate. The posts are fed into the plate 41 at the left, are drilled when reaching the point 45 and are ejected, as explained later with reference to Fig. 6.

Since the work pieces are circular, they have to be clamped against turning when drilled and for this purpose a clamping lever 49 is pivoted to a post at 50, and its upper arm ends in a clamping finger 51 shaped to fit the work piece. The lower arm carries the armature 52 of an electromagnet 53. The lever 49 is normally kept against the stop 54 by a spring 55. When the magnet 53 is energized, the finger 51 is pressed against the work piece 43, clamping it against the scallop 48 of the plate 41. The finger 51 also serves the purpose of accurately registering the position of the indexing table, by turning it, if necessary, till the work piece fits into the curve of the finger.

In the case of work pieces which are held against turning by reason of their form, the finger 51 is employed only to register the indexing table, being given a V-shaped end adapted to enter notches in the plate 41.

The work pieces are ejected by a lever pivoted at 56, its lower arm 58 being an armature adapted to be attracted by the magnet 57, while its other arm 59, is below the shoulder of the work piece 43. On the magnet 57 being energized, the upper or left hand arm 59 is jerked upwards, ejecting the work piece from the plate 41. The lever 58, 59 is normally kept in the position shown by the spring 60 and stop 61.

The cams 23 are arranged to energize the solenoid 34 and the magnets 53 and 57 through the contacts 24, as follows:

On the up-stroke of the drill spindle, the solenoid 34 is energized and the indexing table is turned to bring a work piece into the drilling position 45; the magnet 53 is then energized to clamp the work piece and register the table; the solenoid is then deenergized, but the magnet 53 is kept energized during the down-stroke of the drill and drilling period, and during the start of the up-stroke till the drill is out of the work piece, and is then deenergized; the magnet 57 is energized to eject the work piece at any time during the stationary period of the indexing table.

It is seen that there is no mechanical connection between the drilling machine proper and the indexing, clamping and ejecting devices. It is, therefore, easy to make any alteration required for drilling work pieces of different forms. Thus, a plate 41 is constructed to hold the pieces and is fixed to the indexing table; if the pieces are of a size larger than the pitch of the teeth 29, the cam for energizing the solenoid 34 may be arranged to energize it twice in rapid succession, so that the indexing table is moved through the pitch of two teeth at each operation; a different form of ejecting device can be fixed to the table 26 in place of the one shown. Again, the drilling period and rate of feed can be altered by changing the cam 13, and suitable times of operation of the devices on the table are determined by fitting appropriate cams 23. Further, the revolutions of the drill per cycle can be varied by varying the ratio of the gear wheels, 20 and 21.

The motor M, Fig. 7, of the machine is energized upon the closure of the main and button switches. Then, a moderated and rectified current is made available to the control devices, said current being influenced by passage through the transformer T and the rectifier R. Cam contacts 24'' close at a time when the drill is raised, and then the solenoid 34 is energized to operate the ratchet and turn the work table through one tooth space. The circuit therefor includes wire 73, cam contacts 24'', solenoid 34, and wires 71 and 70 back to the rectifier R.

Directly after the movement of the table and before the drill descends, the magnet 53 is energized and held in operation to detent the table and clamp the work piece which is to be operated upon. The energization of magnet 53 is timed by the closure of cam contacts 24. The circuit comprises wires 73 and 74, cam contacts 24, wire 75, magnet 53, resistances R2 and R3 and wires 72 and 70 back to the common rectifier R. Arranged in shunt across contacts 24 are the condenser C and the resistance R1 to prevent sparking at the contacts.

The other magnet 57 is energized to eject the work piece at a time while the indexing table is stationary. Upon closure of cam contacts 24', a circuit is established including wire 73, cam contacts 24', magnet 57, resistance R4 and wires 72 and 70 to the rectifier R.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a drilling machine with means for drilling work pieces on a rotating index table and having in combination, means for advancing said table step by step to present the work pieces successively for drilling, a solenoid for operating said advancing means, means for energizing said solenoid between operations of drilling, a clamping means for holding said work pieces on said table and for registering said table in position, a magnet for operating said clamping means, means for energizing said magnet before the operation of drilling and for holding said energization during drilling, an ejecting means for removing the work pieces from the table, a magnet for operating said ejecting means, and means for energizing said ejecting magnet as an incident to each drilling operation and while said table is stationary.

2. The combination set forth in claim 1 including a slow speed shaft operated continuously during drilling, three adjustably and removably mounted cams on said shaft, three pairs of cam contacts operated by said cams, and electrical circuits connecting each of said pairs of contacts as part of one of said energizing means to control drilling.

3. The combination set forth in claim 1 wherein said ejecting means includes an armature, a portion of which is brought into cooperation with a work piece to jerk it away from the index table.

4. The combination set forth in claim 1, wherein said clamping means includes an armature, a portion of which is formed to engage a work piece to hold it in position to be drilled and to prevent rotation.

WILLIAM CHARLES VINES.

REFERENCES CITED

The following references are of record in the file of this patent:

UNITED STATES PATENTS

| Number | Name | Date |
|---|---|---|
| 1,786,034 | Smith | Dec. 23, 1930 |
| 2,303,243 | Trythall | Nov. 24, 1942 |
| 2,389,668 | Johnson | Nov. 27, 1945 |
| 2,394,769 | Heckethorn | Feb. 12, 1946 |